United States Patent [19]

Johnson

[11] Patent Number: 4,781,515
[45] Date of Patent: Nov. 1, 1988

[54] ROLLER MOUNTING SYSTEM FOR BOAT TRAILER

[76] Inventor: Lawrence N. Johnson, W. 130 Highdrive, Spokane, Wash. 99203

[21] Appl. No.: 850,050

[22] Filed: Apr. 10, 1986

Related U.S. Application Data

[60] Continuation-in-part of Ser. No. 727,721, Apr. 26, 1985, Pat. No. 4,611,748, which is a division of Ser. No. 65,118, Aug. 9, 1979, Pat. No. 4,530,634.

[51] Int. Cl.⁴ .............................................. B60P 3/10
[52] U.S. Cl. .................................. 414/534; 193/35 C; 403/258
[58] Field of Search ............... 414/529, 532, 533, 534; 403/258, 259, 260; 280/414.1; 193/35 C, 35 R, 37

[56] References Cited

U.S. PATENT DOCUMENTS

| 2,662,236 | 12/1953 | Kester  | 280/43.24 |
| 4,278,388 | 7/1981 | Johnson | 414/534 |
| 4,530,634 | 7/1985 | Johnson | 414/534 |
| 4,611,948 | 9/1986 | Johnson | 403/246 X |

FOREIGN PATENT DOCUMENTS

| 2109046 | 5/1972 | France | 403/260 |
| 1030631 | 5/1966 | United Kingdom | 403/258 |

Primary Examiner—Robert J. Spar
Assistant Examiner—Stuart J. Millman
Attorney, Agent, or Firm—Wall and Roehrig

[57] ABSTRACT

There is provided a pivotally mounted hull-engaging roller system for a roller trailer for facilitating loading and unloading a boat and assuring efficient support of a boat loaded thereon. The pivotal mounting permits the hull contacting elements or rollers to tilt inwardly without the need for any particular tilting capability. The hull-engaging rollers of the invention are supported on the trailer crossbars by an improved bracket having the capability of effectively supporting the crossbars for pivotal movement relative to the trailer side booms. The improved roller mounting structure disclosed herein accommodates a variety of various designed craft hulls.

3 Claims, 4 Drawing Sheets

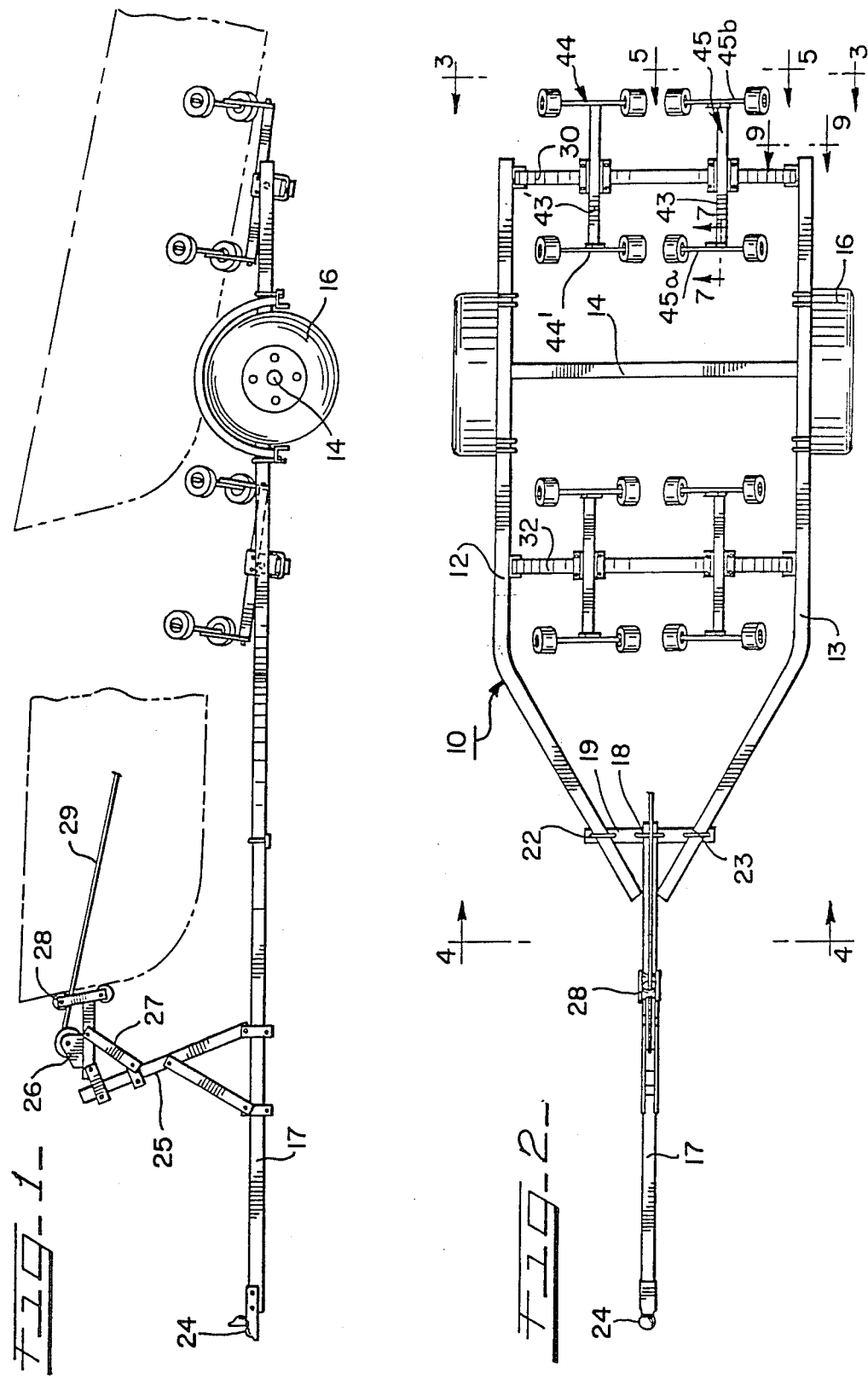

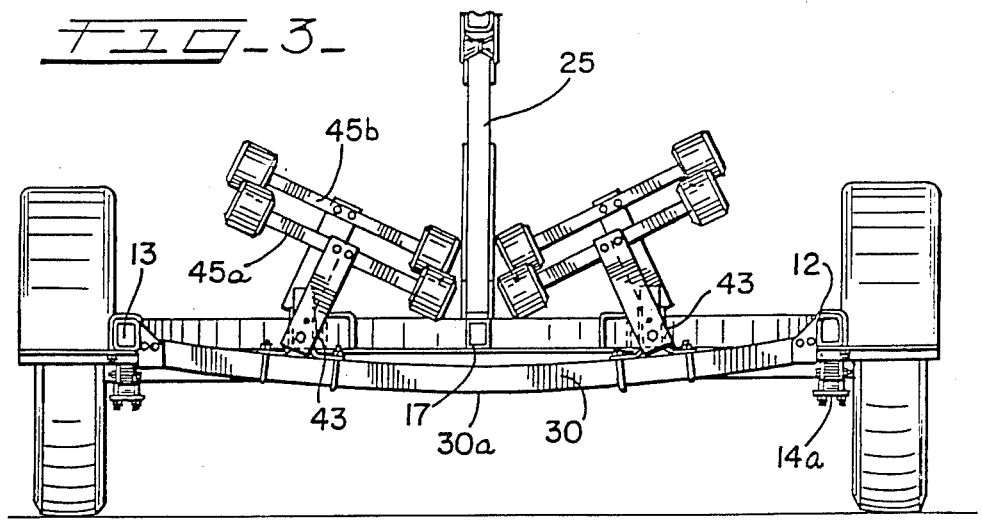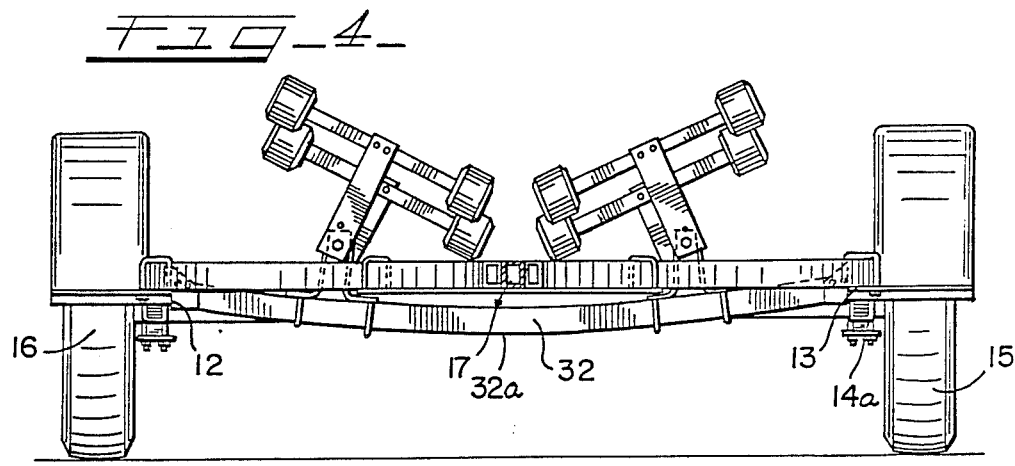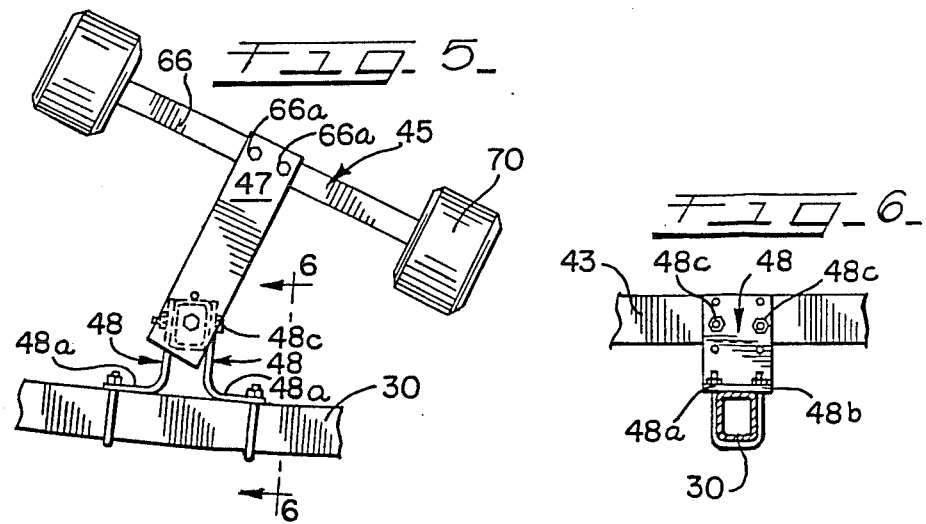

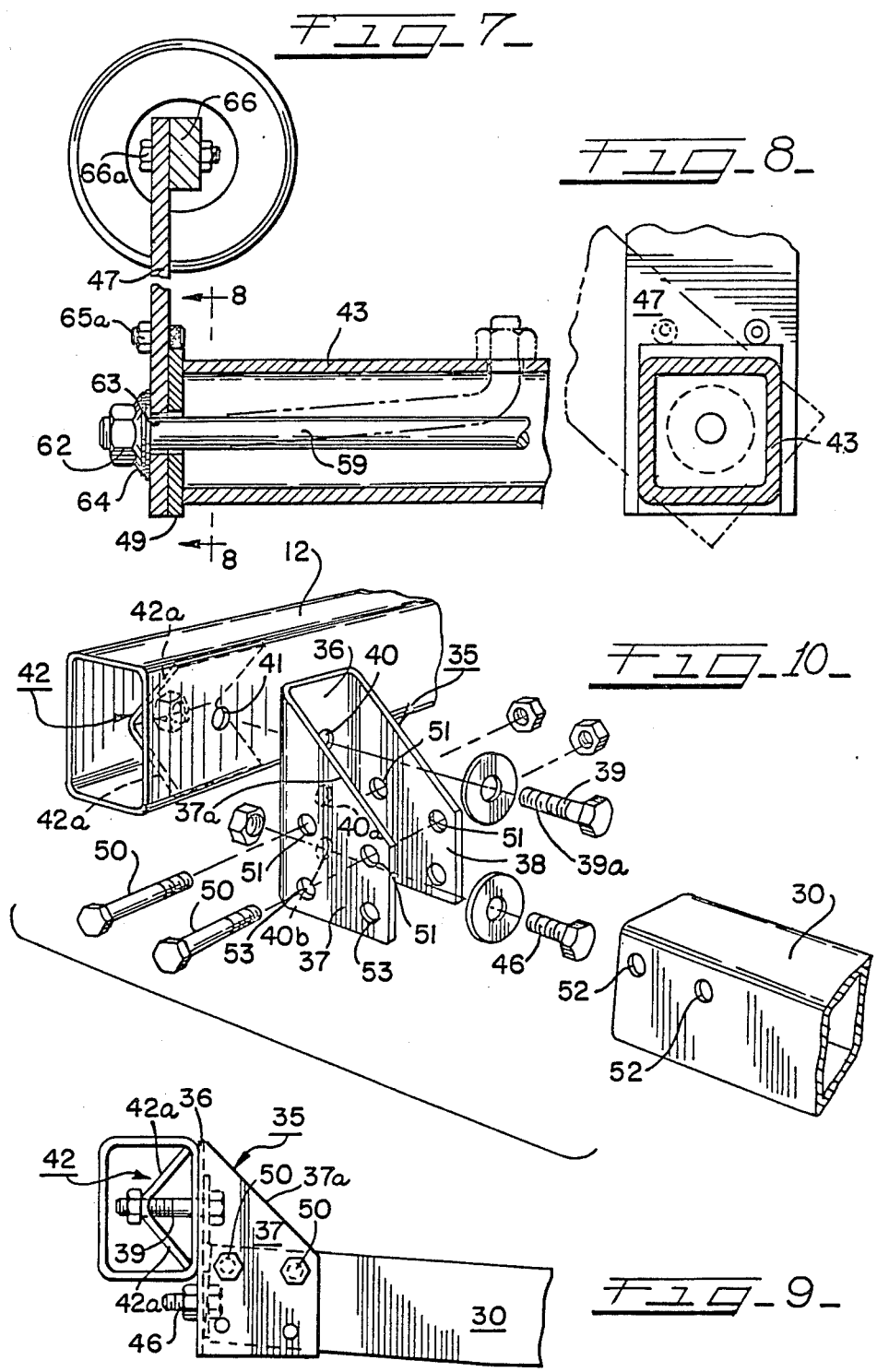

ROLLER MOUNTING SYSTEM FOR BOAT TRAILER

BACKGROUND OF THE INVENTION

This is a continuation-in-part application of application Serial No. 727,721 now U.S. Pat. No. 4,611,948 which is a division of Serial No. 65,118 now U.S. Pat. No. 4,530,634.

This invention relates, in general, to boat trailers and in particular, to roller boat trailers for hauling and storing a variety of boats of the type generally referred to as pleasure boats.

More specifically, but without restriction to the particular uses being described, this invention relates to a pivotal roller mounting system for a roller boat trailer.

Boat trailers have achieved increasing popularity in recent years due to the convenience and mobility they provide for transporting and storing boats of various designs on land with the capacity of being launched and loaded from the water as desired. To achieve such versatility, it is well recognized that a boat trailer must securely support the boat and that the boat supporting elements on the trailer conform to the boat hull contour so that pressures exerted thereby are distributed and localized stress, which will result in damage to the hull, is avoided. Generally, such boat supporting elements are secured to crossbar members of the trailer frame to enable the boat supporting elements to be situated at desired positions laterally of the trailer.

SUMMARY OF THE INVENTION

It is, therefore, an object of the present invention to improve boat trailers.

It is another object of this invention to mount hull-engaging elements of the trailer on pivotal cross members.

Another object of this invention is to support the hull engaging members of a boat trailer for selected pivotal movement about an axis parallel to the longitudinal axis of the trailer.

Still another object of this invention is to mount the hull engaging members of a trailer on an improved bracket for pivotal movement in a plane substantially normal to the longitudinal axis of the trailer.

These and other objects are attained in accordance with the present invention wherein there is provided a pivotally mounted hull-engaging roller system for a roller trailer for facilitating loading and unloading a boat and assuring efficient support of a boat loaded thereon. The pivotal mounting permits the hull contacting elements or rollers to tilt inwardly without the need for any particular tilting capability. The hull-engaging rollers of the invention are supported on the trailer crossbars by means of an improved bracket means having the capability of effectively supporting the crossbars for pivotal movement relative to the trailer side booms. The improved roller mounting structure disclosed herein accommodates a variety of various designed craft hulls.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a side elevation of a boat trailer upon which the improved pivotal boat hull engaging roller system of the invention may be mounted illustrated with a trailer being shown with a shallow draft-type boat being indicated in phantom lines in two positions, one at the start of loading, and the other at a full loaded position;

FIG. 2 is a plan view of the trailer structure shown in FIG. 1;

FIG. 3 is a rear elevational view, to an enlarged scale, showing the rear pivotal dropped crossbar roller mounting system and bracket upon which the roller system may be mounted, the view being taken on the line 3—3 of FIG. 2;

FIG. 4 is a front elevational view, to an enlarged scale, showing the front pivotal dropped crossbar roller mounting system and mounting bracket upon which the roller system may be mounted, the view being taken on the line 4—4 of FIG. 2;

FIG. 5 is an elevational view, to an enlarged scale, the view taken along the line 5—5 of FIG. 2;

FIG. 6 is a sectional view, to an enlarged scale, taken along the line 6—6 of FIG. 5;

FIG. 7 is a sectional view, to an enlarged scale, taken along the line 7—7 of FIG. 2;

FIG. 8 is a sectional view, to an enlarged scale, taken along the line 8—8 of FIG. 7;

FIG. 9 is a fragmentary end view of a pivotal dropped crossbar upon which the roller system may be mounted coupled to a longitudinal boom, taken along the line 9—9 of FIG. 2;

FIG. 10 is an exploded perspective view, to an enlarged scale, showing the bracket for mounting the pivotal dropped crossbar to a longitudinal boom;

DESCRIPTION OF THE PREFERRED EMBODIMENT

Figure 11:
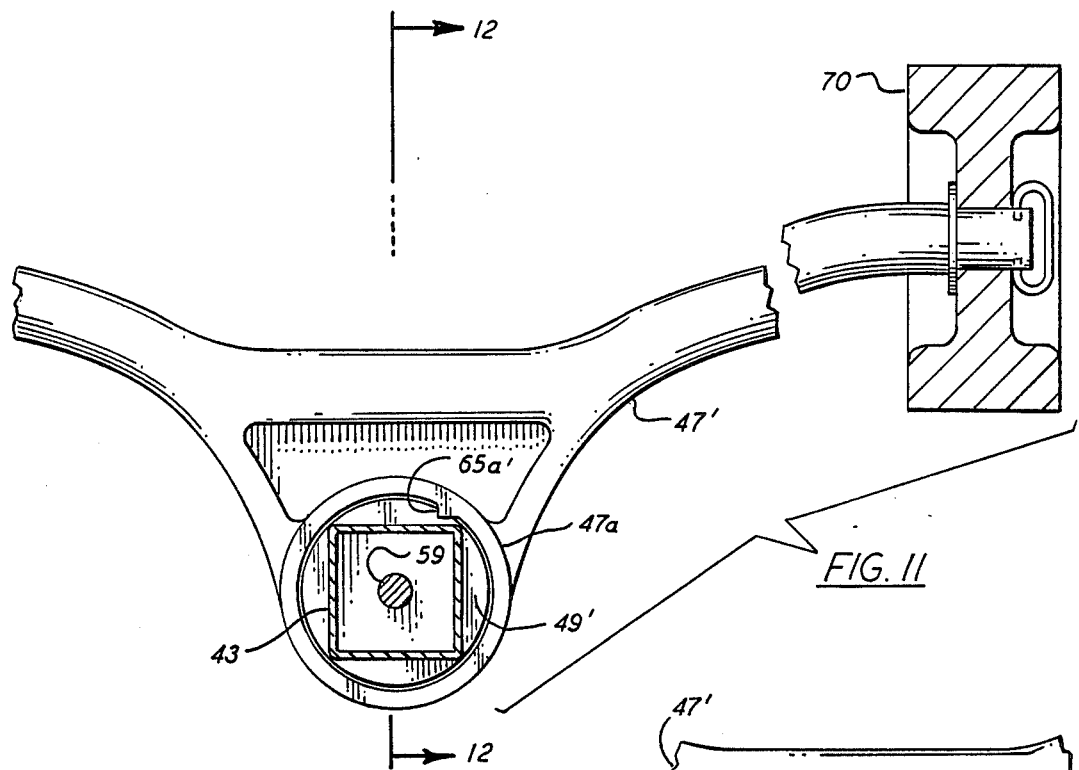
FIG. 11 is an elevational view, to an enlarged scale, showing an alternative boat-hull-engaging roller mounting structure of the invention, the view being taken in the same direction as in FIG. 5 with parts broken away.
Figure 13:
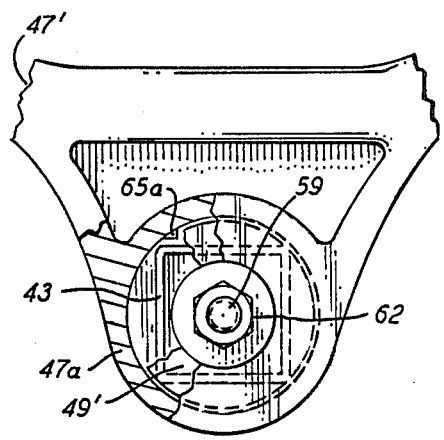
FIG. 13 is a partial end view with portions broken away in the direction of 13—13.

Although not intended to be so limited, for convenience of illustration, the improved boat trailer roller mounting system of the invention is shown in connection with a trailer for loading and hauling or supporting a low or shallow draft type boat. The illustrated trailer construction enables the boat to be loaded directly from the water by backing the trailer down a ramp or incline and bringing the rearmost hull engaging roller assemblies into position close to the boat. The boat is then advanced into contact with the roller assembly and drawn forward into supporting engagement with the rearmost hull engaging roller assemblies.

In the trailer arrangements shown in FIGS. 1 to 12, the basic frame structure 10 comprises laterally spaced, elongated side frame members or booms, 12 and 13, arranged in parallel relation and supported upon an axle 14 and springs 14a which are longitudinally adjustable relative to the side boom or frame members. On the opposite ends of the axle 14 are wheels 15, 16, each of which is partially covered by an associated fender. While a single axle arrangement is shown, a double axle tandem axle arrangement may be used, either of which may be moved along the side booms 12 and 13, to obtain a desired total weight distribution that is known to those skilled in the art.

The forward ends of the longitudinal side frame members 12, 13 have tongue forming portions which converge toward each other to terminate on opposite sides of a tongue 17. The tongue 17 extends along the longitudinal centerline of the trailer frame, with the trailing end secured by a U-bolt 18 to a short tongue-to-boom yoke 20 which has its opposite end secured by U-bolts 22, 23 adjacent the ends of the side frame members 12 and 13. The forward end of the tongue 17 has mounted thereon a hitch coupler 24 for connection to a cooperating connecting element on a powered vehicle used for pulling the trailer. An upstanding, substantially inverted Y-shaped, winch stand 25 is carried on the tongue 17, which is adjustable fore, aft, and vertically, and supports at its upper end a manually or power operated winch 26. The winch 26 is mounted on a frame assembly 27 which extends in a direction of the rear or trailing end of the trailer. The frame assembly 27 also supports a bow-engaging roller stop assembly 28 provided for steadying the bow end of the boat when in a fully loaded position during its transport. The winch 26 includes a cable 29 with means for attaching a free end to the bow of the boat for drawing the boat onto the roller assembly supports of the invention.

The trailer side frame members or booms 12, 13 are laterally spaced by crossbar members 30 and 32, which are pivotally supported therefrom. In the form illustrated, which is arranged for supporting a shallow draft power boat thereon, the crossbar member 30 is mounted near the trailing end of the trailer, while crossbar member 32 is spaced forwardly thereof. The position and spacing of these members lengthwise on the trailer will depend upon the weight distribution of the boat to be carried. Each of the cross members 30 and 32 are illustrated having a dropped or curved lengthwise configuration resulting in a bowed appearance, as best shown in FIGS. 3 and 4, having their lowest bottom point 30a, 32a coinciding substantially with the longitudinal centerline of the trailer.

The pivotal crossbar members 30 and 32, which laterally span the side booms 12 and 13 for forming the basic trailer structure, are pivotally mounted at their opposite ends on side booms 12 and 13 in an identical manner so as to enable them to tilt or pivot within predetermined limits about axes extending transversely of the frame to facilitate loading the boat directly from or into the water. The pivotal mounting system of the cross member 30, 32, as illustrated on the trailer in FIGS. 1 and 2, is best shown in FIGS. 9 and 10, and comprises an improved connecting bracket member 35 of substantially U-shape in a horizontal cross section. Although connecting bracket 35 is described and illustrated in FIGS. 9 and 10, with respect to the left end of cross member 30 viewing FIG. 1, the identical corresponding bracket is utilized to mount the other end of cross member 30 and front cross member 32.

The bracket 35 is formed with a base section 36, a portion of which is adapted to contact the inner side surface of the side boom 12. The bracket member 35 further includes a pair of spaced parallel side sections 37 and 38 integrally coupled to the bottom section 36 and extending perpendicularly therefrom to form the U-shape of the bracket. The upper edges 37a, 37b of side sections 37 and 38 slope downwardly from the upper edge of base 36 to form substantially trapezoidal-shaped side vertical surfaces, respectively.

Bracket member 35 is attached by means of a pivot bolt 39 to side boom 12 for pivotal movement about an axis transverse to the longitudinal axis of the trailer. Pivot bolt 39 extends through an upper bolt hole 40 formed in base section 36 and a corresponding bolt hole 41 provided in the inner lateral face of a boom member 12, 13. Additional holes 40a and 40b are formed in the base section 36 to permit variation in the vertical positioning of the cross member 30 relative to the side booms 12, 13. The diameter of bolt 39 is somewhat less than the diameter of these bolt holes to permit pivotal movement or swiveling of bracket 35 relative to boom 12 in a manner to be described. The threaded end 39a of pivotal bolt 39 protrudes through a retention bracket 42 having angularly disposed legs 42a which respectively compress against the inner corners of boom member 12 upon tightening of a nut member. Retention bracket 42 creates a solid interface with bracket member 35 to assure adequate support even when the boom 12 is constructed of lighter gauge tubing. Although it is within the scope of the invention to support bracket member 35 by means of a thru-bolt extending through both lateral surfaces of boom members 12, 13, the use of tension bracket 42 as shown in FIGS. 9 and 10 is advantageous because it minimizes collapse of the side boom tube and ultimate undue and detrimental flex in the boom and tongue assembly.

The base section 36 of bracket 35 is provided with a stop bolt 46 which is positionable through any one of a series of vertically aligned bolt hole 40, 40a, or 40b to limit the throw of cross member 30 by contacting the underside of boom 12, 13. For very high settings, as needed for certain deck boats, bolt 39 may support the bracket swiveling movement through bolt hole 40b and the stop bolt 46 may be retained in bolt hole 40 to act as a stop through contact with the upper surface of boom 12, 13. From the foregoing, it should be apparent that bracket 35 and cross member 30 are capable of undergoing pivotal movement about the axis created by pivot bolt 39.

The crossbar member 30, as shown in FIGS. 9 and 10, is rigidly supported on bracket 35 with its end attached between the pair of spaced side sections 37, 38. A pair of bolts 50 extend through upper bolt holes 51 of side sections 37, 38, respectively, and an aligned pair of holes 52 provided in the cross member 30. The pair of bolts 50 rigidly attach the ends of the cross member 30 to the bracket member 35 for support and pivotal movement therewith. The bracket member 35 optionally includes a pair of lower bolt openings 53 extending through side sections 37, 38 to enable the cross member to be attached at this position relative to the bracket in certain encountered conditions by which such a connection is advantageous to accommodate various boat designs and lend versatility to the system.

The crossbar members 30 and 32 carry hull engaging roller assemblies 44 and 45 which are in the arrangement illustrated, in paired relation with the assemblies of each pair thereof in the form shown, being arranged on opposite sides of the longitudinal centerline of the trailer. Since the details of the assembly of each pair thereof are identical, the elements on one side of the assembly which correspond to the elements on the other side will be identified by the same numerals primed. Although different types of roller assemblies may be carried by the crossbar members 30 and 32 as shown, for purpose of illustration, the same type of roller configuration is employed throughout the trailer with the particular type of configuration depending upon the capacity of the trailer.

In the following description, the hull engaging roller assemblies carried by crossbar members 30 and 32 are disclosed having the capability of pivoting about axes substantially parallel to the longitudinal axis of the trailer when the support members 43, 43' are parallel to the longitudinals 12 and 13. However, the invention herein disclosed is not intended to be so limited since the dropped or curved lengthwise configuration of crossbar members 30 and 32 naturally tilts hull engaging roller assemblies supported thereon in an inward direction achieving improved cradling of a boat loaded on the trailer and effective loading and unloading such as, for example, by virtue of lower positioning of the boat on the trailer and the ability to prevent interference between the hull or keep with the cross member during launching or loading.

The rearmost crossbar member 30, in the form shown for one embodiment, carries hull engaging roller assemblies 44 and 45' of the identical construction which are shown spaced equally on opposite sides of the longitudinal line of the trailer and mounted for pivotal movement. These assemblies 44, 45' comprise support members 43, 43' which are mounted in parallel, transversely spaced relation on the crossbar member 30 and carry at their fore and aft ends pivotally mounted, hull engaging rollers to be described.

Support member 43 is a roller supporting, longitudinally extending tube mounted on the cross frame member 30 by means of a pair of spaced angled brackets 48, each having a lower bent section 48a bearing against the top of cross frame member 30 (FIGS. 5 and 6). Lower bent sections 48a each include a pair of holes 48b positioned fore and aft on the section 48a to receive the legs of a pair of U-bolts 49 embracing crossbar member 30 to affix the angled bracket 48 thereto. The holes 48b are punched in angled brackets 48 in close tolerances to the lateral surfaces of the cross frame bar 30 to insure minimum swing of the member 43 in its lateral position relative to crossbar member 30. Member 43 is affixed to the upper portion of bracket 48 by means of a pair of bolts 48c extending through each pair of brackets 48 and complementary bolt holes situated at a position on tube member 43 intermediate its ends.

The hull engaging roller assembly 45 includes a roller assembly 45a mounted at its forward end and a roller assembly 45b mounted at its trailing end for pivotal movement substantially about the longitudinal axis of the tube member 43. As best shown in FIG. 7, the roller assemblies 44 and 45 are mounted for pivotal movement by means of a support arm or plate 47 pivotally supported at the forward and aft ends of tube members 43 against a bearing plate 49. The plates 49 are each positioned adjacent to the open forward and aft ends of tube members 43, and a long bolt 59 extends through each plate 49 and outward through a corresponding bolt hole 63 in support arm 47 (FIGS. 7 and 8). While the bolt 59 is preferred as being a rod threaded at both ends, one of the ends bearing against tube 43 could be a standard bolt head or any other structure for pinning one end. In addition, as shown in phantom, the bolt 59 could be two separate bolts each including a head bearing on tube 43 and extending downward passing through holes provided in the upper surface of tube member 43 and curving outward to extend along the axis of tube 43. A lock nut 62 retains the support arm and plate to tube 43 as best shown in FIGS. 7 and 8. Thus, the bolt 59 is retained to tube 43 and provides a shaft about which the support arm 47 can rotate. To better permit rotation of the support arms, a conventional washer 64 may be positioned between the nut of the angle bolt and the outer surface of the support arms. As best shown in FIG. 7, a stop 65a in the form of a bolt extending through a hole in the support arm 47, is formed on the side of each support arm 47 to limit the outboard pivotal movement of the roller assemblies away from each other to facilitate drawing a boat on the trailer.

A crossbar member 66 is coupled to the upper end of each of the support arms 46 by any suitable technique such as by a pair of bolts 66a. Crossbar members 66 carry, by suitable journals at their opposite ends, hull engaging rollers 70 which are mounted for free rotation thereon and facilitate continuous engagement of the boat hull at all contact points to evenly distribute the weight during launching, loading, or transport through a multi-planar and/or compound pivotal action. From the foregoing, it should be apparent that the pivotally secured support arm 47 produces an arcuate motion of cross bar member 66 with rollers 70 about an axis formed along tube member 43. Such a mounting supports the roller assembly at a greater spaced distance from the longitudinal centerline of the trailer permitting rollers 70 to contact a boat hull during transport and storing at an optimum lower position so as to provide greater lateral stability of the boat on the trailer. This increase in lateral stability by the support assembly is achieved with the capability of the support rollers being able to maintain contact with the configuration of the boat hull as it moves past rollers 70 during loading or launching. By being positioned in this manner, rollers 70 are able to prevent the bow or keel of a boat from contacting the crossbar member of the trailer frame because the lower pivot point mounting of arm 47 swings the rollers farther inward towards the center during launching. Thus, by shifting the pivot point of the roller assembly farther outward and lower on the frame on the dropped cross member, better transport, loading, and launching characteristics are achieved.

Figure 12:
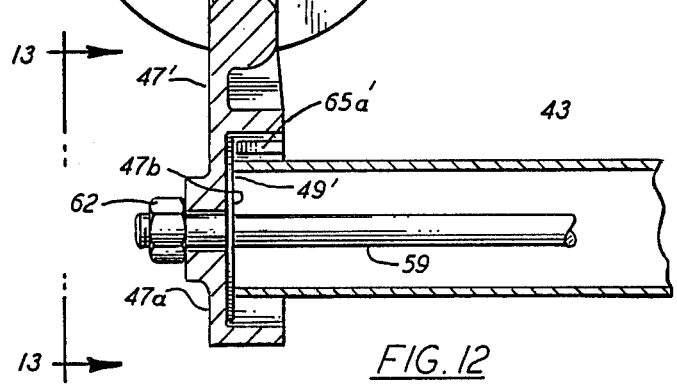
FIG. 12 is a sectional view, taken along the line 12—12 of FIG. 11.

Referring now to the embodiment of the boat hull engaging roller assembly shown in FIGS. 11 and 12, the hull engaging roller assembly 45' includes a roller assembly 45a mounted at its forward end and a roller assembly 45b mounted at its trailing end for pivotal movement in a plane substantially normal to the longitudinal axis of the tube member 43. The roller assemblies 45', like roller assemblies 44 and 45, are mounted for pivotal movement at the forward and aft ends of tube members 43. To this end, a gull wing shaped support arm 47' is carried at each end of the tube members 43, and connected for pivotal movement relative to the tube members 43 by a long bolt 59 which extends through the tubes 43 and outward through each of the support arms 47 positioned at the ends thereof through a corresponding bolt hole 63 in the support arms 47', or in any of the other manners as described with reference to the embodiment described with reference to FIG. 7.

The support arm 47' is formed with a cup-shaped portion 47a which fits over and closes each end of the tube 43. A bearing plate or washer 49' is positioned between the ends of the tube 43 and the inner face 47b of the cup portion 47a of the support arm with the tie rod 59 passing through an opening therein. The washer or bearing plate 49' functions to receive the thrust or tension between the end of the tube 43 and the inner face or wall 47b of the cup portion 47a due to the tightening of the support arm 47' on the tie rod 59 through the lock nut 62 at one or each end of the tie rod. The tightening of the lock nut (62) holds the hull engaging roller assemblies on each end of the tubes 43.

Since the cup portion 47a surrounds the end of the tube 43, the weight loading applied when a boat is on a hull engaging roller 70 permits the boat weight to be applied to the end of the tube 43 rather than applying a shearing force on the tie rod 59. Such transfer of the bearing weight directly to the tube 43, eliminates the application of any shearing force across the tie rod 59. A stop 65a' is formed on the inner surface of the cup shaped portion 47a, and functions as a stop in the same manner as the stop 65a disclosed with reference to the embodiment of FIG. 7 to limit the outboard pivotal movement of the roller assemblies away from each other thereby facilitating movement of a boat onto the trailer.

While the invention has been described in the specification and illustrated in the drawings with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the description of the appended claims.

What is claimed is:

1. A roller assembly for supporting a boat on a boat trailer wherein the boat trailer includes at least one cross bar extending transversely to the longitudinal axis of the trailer and supported between spaced side frame members, said cross bar carrying thereupon at least one support tube which extends in a direction transverse to the longitudinal axis of the cross bar, said support tube carrying thereupon a support arm pivotal relative to the support tube at the point of connection therewith in a plane transverse to the longitudinal axis of the support tube, and boat hull engaging rollers carried upon the support arm, the improvement comprising
   a cup-shaped portion formed at an end of said support arm and positioned to operatively engage the end of the support tube,
   said cup-shaped portion surrounding a proximal end of the support tube for transmitting a loading force imposed on the support arm through the boat hull engaging rollers to the proximal end of said support tube, and
   stop means carried on said support arm comprising an integral part formed within the cup-shaped portion of said support arm and positioned thereupon to engage the support tube for limiting the pivotal movement of the support arm relative to the support tube.

2. The apparatus of claim 1 wherein said stop means is positioned to permit greater pivotal movement towards the longitudinal axis of the trailer than pivotal movement away from the longitudinal axis of the trailer.

3. The apparatus of claim 1 further including bearing means positioned between the inner face of said cup-shaped portion and the proximal end of the support tube.

* * * * *